United States Patent

Takahashi et al.

[11] Patent Number: 6,098,681
[45] Date of Patent: Aug. 8, 2000

[54] PNEUMATIC RADIAL TIRE INCLUDING CHAMFERED BLOCKS

[75] Inventors: Ichiro Takahashi; Yukihiro Kiwaki, both of Kodaira, Japan

[73] Assignee: Bridgestone Corporation, Tokyo, Japan

[21] Appl. No.: 09/189,980

[22] Filed: Nov. 12, 1998

[30] Foreign Application Priority Data

Nov. 12, 1997 [JP] Japan ................................ 9-310129

[51] Int. Cl.⁷ ...................... B60C 11/03; B60C 107/00
[52] U.S. Cl. ................................ 152/209.15; 152/209.28
[58] Field of Search ................. 152/209.14, 209.15, 152/209.28

[56] References Cited

U.S. PATENT DOCUMENTS

| | | | |
|---|---|---|---|
| 4,155,392 | 5/1979 | Duderstadt et al. | 152/209.14 |
| 4,722,378 | 2/1988 | Carolla et al. | 152/209.15 |
| 5,421,391 | 6/1995 | Himuro . | |
| 5,609,699 | 3/1997 | Himuro | 152/209.15 |
| 5,707,461 | 1/1998 | Himuro . | |
| 5,714,021 | 2/1998 | Ochi . | |
| 5,885,384 | 3/1999 | Himuro . | |

FOREIGN PATENT DOCUMENTS

| | | | |
|---|---|---|---|
| 688685 | 12/1995 | European Pat. Off. | 152/209.28 |
| 3743878 | 7/1988 | Germany | 152/209.15 |
| 5-319025 | 12/1993 | Japan | 152/209.15 |
| 8-310205 | 11/1996 | Japan | 152/209.15 |

Primary Examiner—Steven D. Maki
Attorney, Agent, or Firm—Sughrue, Mion, Zinn Macpeak & Seas, PLLC

[57] ABSTRACT

A pneumatic radial tire comprises a tread provided with many blocks defined by grooves and/or sipes, in which (1) a peripheral portion of each of the blocks is chamfered in form of a curve or a straight line over a given region at a given chamfering depth in a mold during the vulcanization of the tire, and (2) the outer surface of the block becomes flat or substantially flat when the tire after the vulcanization is assembled onto a normal rim and inflated under a normal internal pressure.

7 Claims, 1 Drawing Sheet

PNEUMATIC RADIAL TIRE INCLUDING CHAMFERED BLOCKS

BACKGROUND OF THE INVENTION

1. Field of the Invention

This invention relates to a pneumatic tire and more particularly to a pneumatic radial tire comprising a tread provided with many blocks defined by grooves and/or sipes.

2. Description of Related Art

In the conventional pneumatic radial tire comprising a tread provided with many blocks, there is a tendency that edge portions of the block jump up outward in a radial direction of the tire and hence an outer surface of the block becomes not flat when the tire is assembled onto a normal rim and inflated under a normal internal pressure. As a result, when the block contacts with ground, the distribution of ground contact pressure becomes ununiform and the ground contact pressure at the edge portion of the block becomes high and hence there are caused problems that a level of a pattern noise deteriorates and steering stability lowers.

SUMMARY OF THE INVENTION

It is, therefore, an object of the invention to solve the aforementioned problems in the pneumatic tire comprising a tread provided with many blocks defined by grooves and/or sipes and to provide a pneumatic radial tire for passenger car having an excellent level of pattern noise and steering stability by making the ground contact pressure of the block as uniform as possible.

According to the invention, there is the provision of a pneumatic radial tire comprising a tread provided with many blocks defined by grooves and/or sipes, in which (1) a peripheral portion of each of the blocks is chamfered in form of a curve or a straight line over a region corresponding to 20–80% of a shortest distance from a center of gravity of each block to a side of each block at a chamfering depth of 0.1–0.5 mm in a mold during the vulcanization of the tire, and (2) the outer surface of the block becomes flat or substantially flat when the tire after the vulcanization is assembled onto a normal rim and inflated under a normal internal pressure.

The pneumatic tire is used by assembling onto a standard rim standardized through JATMA (Japan), TRA (USA), ETRTO (Europe) or the like in accordance with the size of the tire. This standard rim is usually called as a normal rim. The term "normal rim" used herein means a standard rim corresponding to an applied size and ply rating defined in JATMA YEAR BOOK 1997.

Similarly, the terms "normal load" and "normal internal pressure" used herein mean a maximum load capacity corresponding to an applied size and ply rating and an air pressure corresponding to the maximum load capacity defined in JATMA YEAR BOOK 1997, respectively.

In case of passenger cars, the "normal internal pressure" in this specification indicates 180 kPa according to a "measurement method for tires" defined in JATMA YEAR BOOK 1997, and the "normal load" indicates 88% of the maximum load capacity corresponding to the applied size and ply rating.

BRIEF DESCRIPTION OF THE DRAWINGS

The invention will be described with reference to the accompanying drawings, wherein.

DESCRIPTION OF PREFERRED EMBODIMENTS

The pneumatic radial tire according to the invention has the above structure that the peripheral portion of each of the blocks facing the groove and/or the sipe is chamfered in form of a curve or a straight line over the region corresponding to 20–80% of the shortest distance from the center of gravity of each block to a side of each block at the chamfering depth of 0.1–0.5 mm in the mold during the vulcanization of the tire, whereby the outer surface of the block is made flat or substantially flat when the tire after the vulcanization is taken out from the mold and assembled onto the normal rim and inflated under the normal internal pressure. Therefore, the problem of the conventional technique that the ground contact pressure of the block becomes non-uniform is solved and hence there is provided the pneumatic radial tire having excellent pattern noise level and steering stability.

When the chamfering depth is less than 0.1 mm, the ground contact pressure at each side of the block is not sufficiently decreased. When it exceeds 0.5 mm, the outer surface of the block becomes not flat when the tire is assembled onto the rim and inflated under the internal pressure. Hence when the block contacts with ground, the ground contact pressure of the side of the block is too low or the side of the block does not contact with ground. In any case, when the chamfering depth is outside the range defined in the invention, the distribution of the ground contact pressure becomes ununiform. Preferably, the chamfering depth is 0.2–0.4 mm.

When the chamfering width in each side of the block is less than 20% of the shortest distance, the ground contact pressure at the side of the block is not sufficiently decreased, while when it exceeds 80% of the shortest distance, the ground contact pressure at the central portion of the block becomes too high.

When the chamfering width is outside the range defined in the invention, the distribution of the ground contact pressure becomes ununiform. Preferably, the chamfering width is 20–50%.

Figure 1:
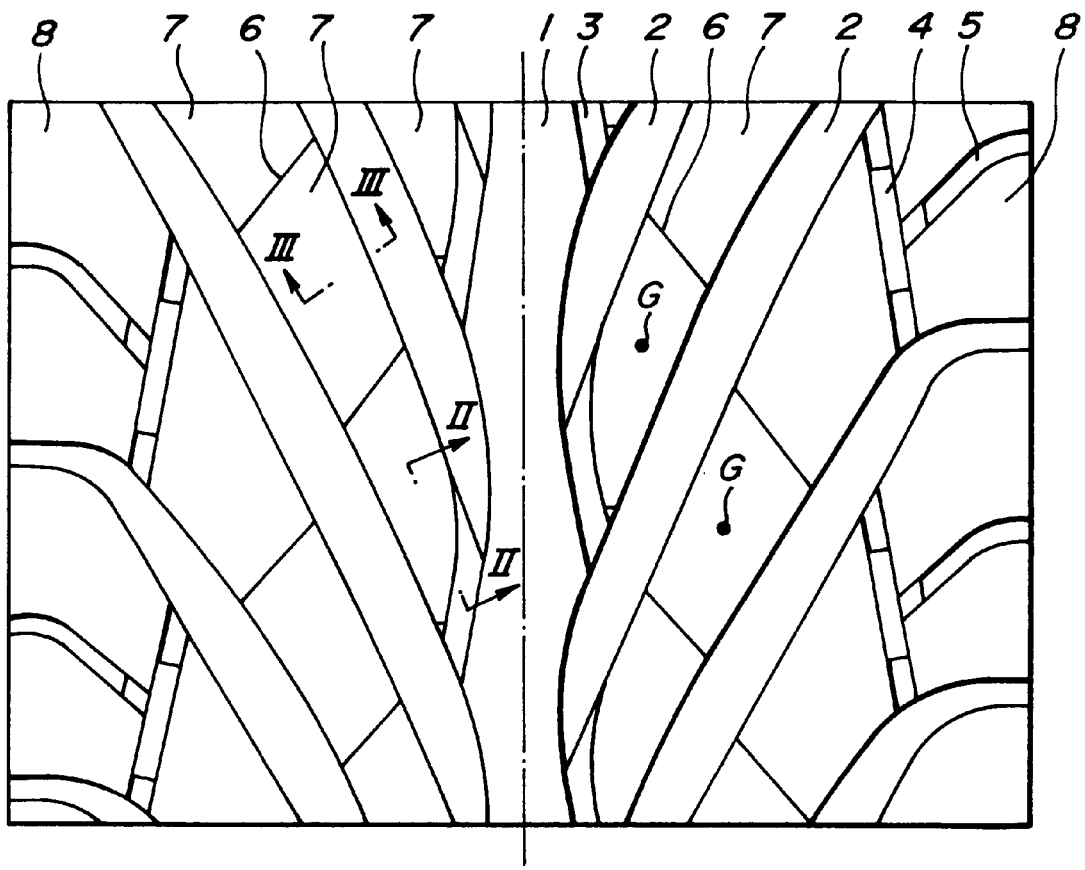
FIG. 1 is a schematic view of an embodiment of the tread pattern in the pneumatic radial tire according to the invention.

In FIG. 1 is shown a partly enlarged schematic view of an embodiment of the tread pattern in the pneumatic radial tire for passenger car according to the invention. In this case, the tire size is 235/45ZR17.

As shown in FIG. 1, a tread of the tire comprises a central rib 1 extending in a circumferential direction of the tire, plural slant main grooves 2 arranged on both sides of the central rib 1 and extending in a direction inclined with respect to the circumferential direction in herringbone form, plural central circumferential grooves 3 each arranged in a central region of the tread and connecting adjacent slant main grooves 2 to each other, plural side circumferential grooves 4 each arranged in each of side regions of the tread and connecting adjacent slant main grooves 2 to each other, plural side slant grooves 5 each extending from the side circumferential groove 4 toward an end of the tread, plural sipes 6 arranged in a land portion defined by the grooves 2, 3 and 4 and many blocks 7 defined by the grooves 2 to 5 and sipes 6.

In the embodiment of FIG. 1, the main slant grooves 2 extend in a direction inclined at an angle of 15–45° with respect to the circumferential direction and are arranged at given intervals in the circumferential direction. And also, these main slant grooves form a directional tread pattern designating a rotating direction of the tire so as to contact a portion of the main slant groove 2 located far away from an end of the tread earlier than a portion near to the end of the tread with ground in the mounting onto a vehicle.

As a modified embodiment, the main slant grooves 2 extend in a direction inclined at an angle of 15–45° with respect to the circumferential direction and are arranged at given intervals in the circumferential direction, but may form a non-directional tread pattern wherein a portion of the main slant groove 2 located far away from an end of the tread contacts with ground earlier than a portion near to the end of the tread in a half region of the tread and the ground contacting relation becomes reverse in the remaining half region of the tread.

Figure 2:
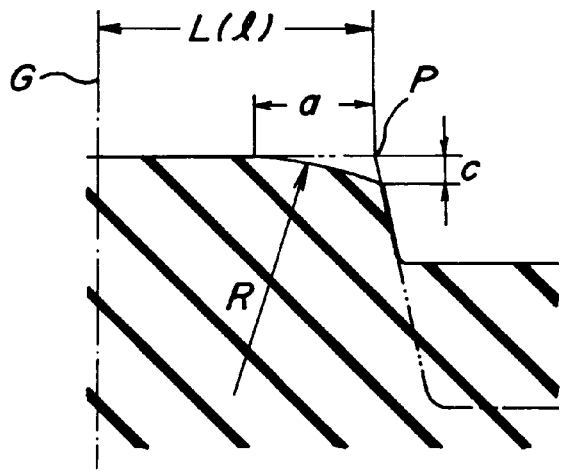
FIG. 2 is an enlarged sectional view taken along a line II—II of FIG. 1.
Figure 3:
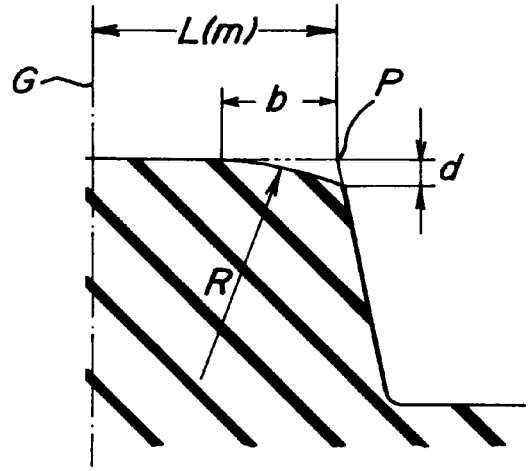
FIG. 3 is an enlarged sectional view taken along a line III—III of FIG. 1.

As shown in FIGS. 2 and 3, the peripheral portion of each of the blocks 7 is curvedly chamfered in a mold during vulcanization. The width to be chamfered in the block is 20–80% of a shortest distance L from a center of gravity G of each block to a side P of the each block to be chamfered. The term "side P" used herein is defined by an intersecting point between an extension line of a mold face forming an outer surface of the block and an extension line of a mold face forming a sidewall of the block. In the block of FIG. 2, the chamfering width a in the longitudinal direction of the block is 5 mm, which corresponds to 22% of a shortest distance L(1) from the center of gravity G of the block to the side P thereof. In the block of FIG. 3, the chamfering width b in the transverse direction of the block is 4 mm, which corresponds to 46% of a shortest distance L(m) from the center of gravity G of the block to the side P thereof. The chamfering depths c, d of the blocks shown in FIGS. 2 and 3 are 0.3 mm, respectively.

In the illustrated embodiment, each of the blocks 7 other than blocks 8 facing the tread end is chamfered at four sides or over a full periphery. On the other hand, each of the blocks 8 is chamfered only at sides facing the main slant groove 2, side circumferential groove 4 and side slant groove 5. In other words, a side of the block 8 constituting the tread end is not chamfered.

In the embodiment of the pneumatic tire according to the invention, the peripheral portion of the each of the block is curvedly chamfered in the mold during the vulcanization as mentioned above. Thus, when the tire after the vulcanization is assembled onto a normal rim and inflated under a normal internal pressure, the outer surface of each of the blocks becomes substantially flat. Since the tire of the illustrated embodiment has a tire size of 235/45ZR17, the normal rim or standard rim is 8JJ-17, and the normal internal pressure is 180 kPa (1.8 kgf/cm$^2$), and the normal load is 88% of the maximum load capacity (650 kg) and is 570 kg.

As a conventional example, the pneumatic tire has the same structure as in the embodiment of the invention except that the peripheral portion of each of the blocks is not chamfered in the mold during the vulcanization.

The tests for pattern noise and steering stability are carried out with respect to these pneumatic radial tires.

The pattern noise is evaluated by measuring a tire noise through a microphone located at a position corresponding to an ear of a test driver when the tire is run on a smooth straight road at a speed of 60 km/h.

When the pattern noise is represented by an index on the basis that the noise level of the conventional tire is 100, the index value of the noise level of the tire in the embodiment according to the invention is 105. The larger the index value, the better the tire performance.

The steering stability is evaluated by a test driver's feeling when the tire is run on a dry circuit test course having a radius of 50 m under various running modes.

When the steering stability is represented by an index on the basis that the conventional tire is 100, the index value of the steering stability of the tire in the embodiment according to the invention is 107. The larger the index value, the better the tire performance.

As seen from the above evaluation results, the pneumatic radial tire according to the invention is superior in the noise level and the steering stability to the conventional pneumatic radial tire.

What is claimed is:

1. A vulcanized pneumatic radial tire comprising:
   a tread having many blocks defined by grooves and/or sipes, in which
   (1) a peripheral side portion of each of the blocks is chamfered in the form of a curve or a straight line over a region corresponding to 20–80% of a shortest distance from a center of gravity of each block to a side of each block at a chamfering depth in the range of 0.1–0.5 mm in a mold vulcanizing the tire, and
   (2) the outer surface of the blocks becomes substantially flat when the tire after vulcanization is assembled onto a normal rim and inflated under a normal internal pressure.

2. A vulcanized pneumatic radial tire according to claim 1, wherein the tread includes main slant grooves extending in a direction inclined at an angle of 15–45° with respect to a circumferential direction of the tire and being arranged at given interval in the circumferential direction in at least a central region of the tread and a part of the peripheral portion of the block is surrounded by these main slant grooves.

3. A vulcanized pneumatic radial tire according to claim 1, wherein said blocks include blocks projecting to an end of said tread and wherein a side of a block facing said tread end is not chamfered.

4. A vulcanized pneumatic radial tire according to claim 1, wherein all peripheral side portions of each block are chamfered other than blocks facing the tread end.

5. A vulcanized pneumatic radial tire according to claim 1, wherein said tread further comprises a circumferential rib and plural slant main grooves arranged on both sides of said circumferential rib, said plural slant grooves inclined with respect to a circumferential direction of said tire.

6. A vulcanized pneumatic radial tire according to claim 5, wherein said blocks are formed between slant grooves.

7. A vulcanized pneumatic radial tire according to claim 5, further comprising plural circumferential grooves.

* * * * *